United States Patent [19]
Fujii et al.

[11] Patent Number: 5,337,168
[45] Date of Patent: Aug. 9, 1994

[54] IMAGE DATA PROCESSING APPARATUS FOR LOCATING PIXEL HAVING MAXIMUM COINCIDENCE COUNT IN INPUT IMAGE DATA

[75] Inventors: Tatsuya Fujii, Nishinomiya; Yukihiro Imai, Kawanishi; Yutaka Sato, Minoo; Ryo Fukui, Yao; Kazuo Sakamoto, Kobe; Naoto Shiraishi, Toyonaka; Yoshiteru Yamada, Kobe, all of Japan

[73] Assignee: Ricoh Company, Ltd., Tokyo, Japan

[21] Appl. No.: 29,397

[22] Filed: Mar. 10, 1993

[30] Foreign Application Priority Data

Mar. 10, 1992 [JP] Japan .................. 4-087720

[51] Int. Cl.⁵ .......................................... H04N 1/419
[52] U.S. Cl. .................................. 358/539; 358/467; 340/146.2; 382/34
[58] Field of Search ............ 358/467, 538, 539, 261.1; 382/34

[56] References Cited

U.S. PATENT DOCUMENTS 4,470,048 9/1984 Short ........................... 382/34
4,682,215 7/1987 Adachi ........................ 358/539
5,121,444 6/1992 Takizawa et al. .............. 382/34

*Primary Examiner*—John S. Heyman
*Attorney, Agent, or Firm*—Mason, Fenwick & Lawrence

[57] ABSTRACT

An image data processing apparatus includes a plurality of registers each of which outputs an output signal in accordance with a corresponding signal of a plurality of input coincidence signals derived from the input image data, the output signal indicating whether or not a corresponding register has a maximum count value, and each input coincidence signal indicating whether or not a corresponding pixel among neighborhood pixels of a target pixel of the input image data coincides with a corresponding dot among predetermined reference dots at given locations relative to the location of the target pixel in the input image data, and a state checking part for outputting a state signal indicating whether or not the output signal level of a first register having the maximum count value currently changes from the previous level by detecting the current output signal level of the first register in accordance with the input coincidence signals and in accordance with the output signals of the registers.

8 Claims, 4 Drawing Sheets

IMAGE DATA PROCESSING APPARATUS FOR LOCATING PIXEL HAVING MAXIMUM COINCIDENCE COUNT IN INPUT IMAGE DATA

BACKGROUND OF THE INVENTION

The present invention generally relates to an image data processing apparatus, and more particularly to an image data processing apparatus in which binary input image data is converted into encoded output data. The encoded output data is used in facsimile systems, database systems and the like.

A picture coding method for converting a stream of binary image data into encoded data based on the probabilities of occurrence of the values 1 and 0 is known. There is an image data processing apparatus in which this picture coding method is utilized. In the above mentioned apparatus, in synchronism with a clock signal of a prescribed period, a set of coincidence signals derived from the input image data is input to a set of registers. The level of each coincidence signal indicates whether or not one of neighborhood pixels surrounding the target pixel in the input image data is coincident with one of predetermined reference dots at given locations relative to the location of the target pixel. When the coincidence mentioned above occurs, a low-level coincidence signal is provided. When the coincidence does not occur, a high-level coincidence signal is provided.

In the above mentioned apparatus, each register performs a counting of the pixel coincidences in accordance with coincidence signals received at the register. The number of the registers is the same as the number of the reference dots, and each register contains a count value indicating the number of coincidences with respect to the corresponding dot among the reference dots. In the picture coding process as mentioned above, it is necessary to detect which pixel of the neighborhood pixels of the current target pixel having a certain relationship with the next target pixel to be encoded. The next target pixel appears in the stream of the input image data after the current target pixel. In order to detect which pixel has the certain relationship mentioned above, it is necessary to locate a register having the highest coincidence count among the registers in the above mentioned apparatus.

FIG. 1 shows a conventional image data processing apparatus for detecting the location of a reference dot having a certain relation with a next target pixel to be encoded. In the image data processing apparatus shown in FIG. 1, four coincidence signals CN0-CN3 derived from input image data are respectively input to four registers 1-4 in synchronism with a clock signal having a prescribed period. In this apparatus, the comparisons for the count values in the registers 1-4 are repeatedly performed by means of three comparators 5-7, and the register having the highest count value is selected from among the four registers 1-4 by means of three selectors 8-10. The selector 10 outputs a signal MAX indicating the count value of the corresponding highest-value register.

More specifically, in the image data processing apparatus shown in FIG. 1, the four coincidence signals CN0-CN3 are respectively input to the four registers 1-4. A count-value signal, which indicates the number of coincidences (the count value) at the corresponding reference pixel counted by the corresponding register, is output from each of the two registers 1 and 2 to the comparator 5. A select signal 1 indicating which of the two registers contains the higher count value is output by the comparator 5. The output select signal of the comparator 5 is input to the selector 8, so that the register containing the higher count value is selected by the selector 8. The selector 8 outputs a signal indicating the count value of the selected register to the comparator 6.

The output signal of the selector 8 and the output signal of the register 3 are input to the comparator 6, so that the count value selected by the selector 8 is compared with the count value of the register 3. A select signal 2 indicating which register contains the higher count value is output by the comparator 6. The output signal of the comparator 6 is input to the selector 9. Similarly, the selector 9 outputs a signal indicating the count value of the selected register to the comparator 7. The same procedure is repeated by the comparator 7 and the selector 10. Finally, in the image data processing apparatus shown in FIG. 1, the selector 10 outputs the signal MAX indicating the highest count value among the count values of the registers 1-4.

The select signals 1-3 received from the comparators 5-7 may be decoded in order to detect which of the four registers contains the highest count value. By receiving the signal MAX from the selector 10, it is possible to find the the highest count value among the count values counted by the four registers.

However, the image data processing apparatus as shown in FIG.1 requires a number of comparators and a number of selectors. The number of the required comparators (or selectors) is smaller than the number of registers by only one. There is the demand for high-performance image data processors in the industry. When the number of bits of the data signal processed by each comparator (or each selector) is increased, or when the number of the input coincidence signals is increased and therefore the number of the registers is increased, the above mentioned image data processing apparatus becomes larger in size, and the manufacturing cost becomes higher.

SUMMARY OF THE INVENTION

Accordingly, it is a general object of the present invention to provide an improved image data processing apparatus in which the above described problems are eliminated.

Another, more specific object of the present invention is to provide an image data processing apparatus which includes a smaller number of comparators and a smaller number of selectors so that a compact image data processor can be built even when the number of bits of the processed data signal is increased or when the number of the input coincidence signals is increased. The above mentioned objects of the present invention are achieved by an image data processing apparatus which includes: a plurality of registers each of which outputs an output signal in accordance with a corresponding signal of a plurality of input coincidence signals derived from the input image data, the output signal indicating whether or not a corresponding register has a maximum count value, and each input coincidence signal indicating whether or not a corresponding pixel among neighborhood pixels of a target pixel of the input image data, which pixel is to be encoded, coincides with a corresponding dot among predetermined reference dots at given locations relative to the location of the target pixel in the input image data; and a state checking part for outputting a state signal indicating whether or not the output signal level of a first register having the maximum count value currently changes from the previous level by detecting the current output signal level of the first register in accordance with the input coincidence signals and in accordance with the output signals of the registers. Each of the registers includes: a counter part for incrementing or decrementing a count value of the register each time a corresponding input coincidence signal indicating the coincidence is received so that the count value of the register is output; a control part for controlling counting operations of the counter part in accordance with a corresponding coincidence signal and the state signal from the state checking part; and a discrimination part for detecting whether or not the register has the maximum count value in accordance with the count value from the counter part so that the output signal indicating whether or not the register has the maximum count value is output.

According to the present invention, it is possible to build a compact image data processor for carrying out the picture coding process without the need to use many comparators or many selectors in the image data processing apparatus even when the number of bits of the processed data signal is increased, or when the number of the input coincidence signals is increased.

Other objects and further features of the present invention will become apparent from the following detailed description when read in conjunction with the accompanying drawings.

DESCRIPTION OF THE PREFERRED EMBODIMENT

Figure 1:
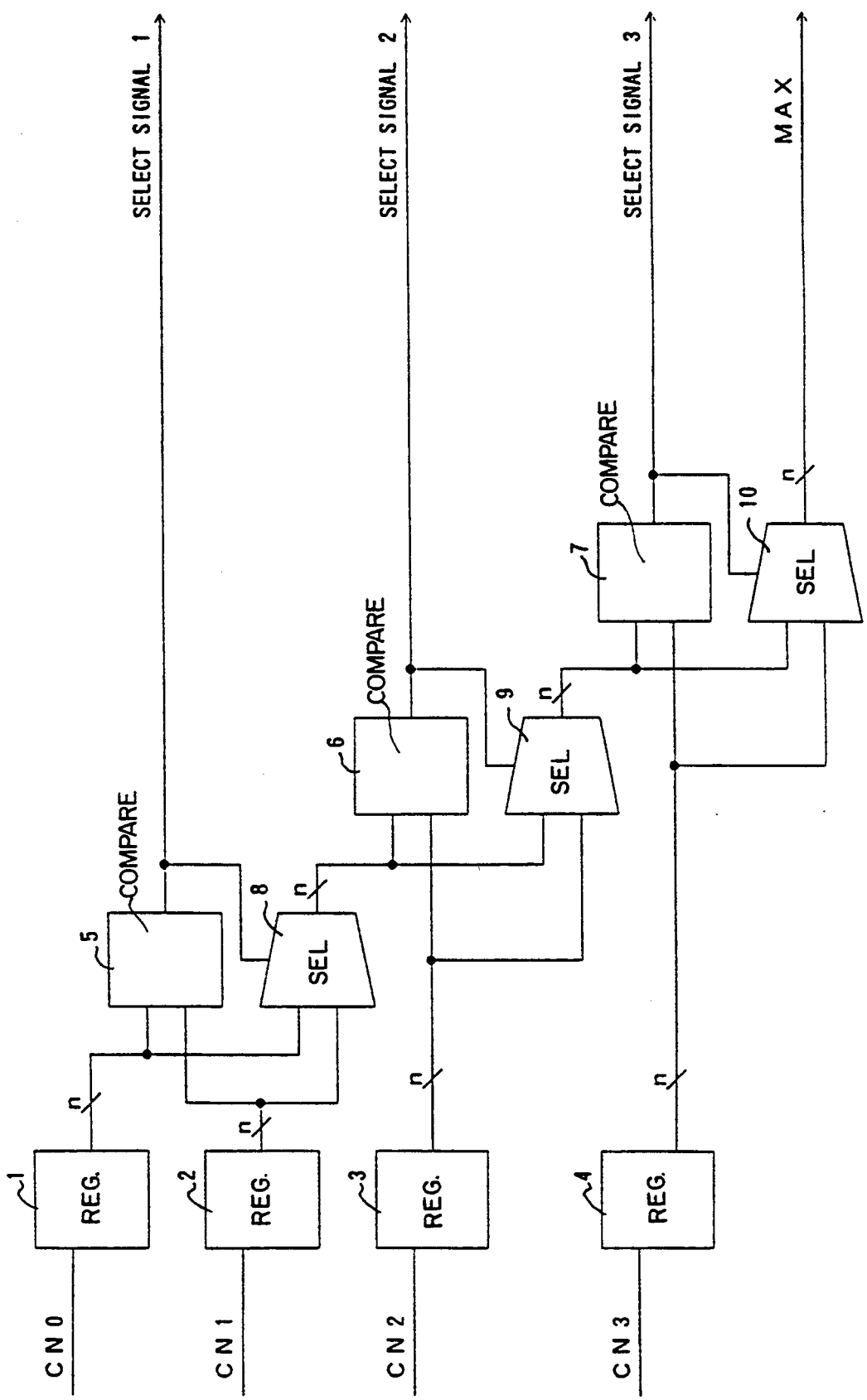
FIG. 1 is a block diagram showing an image data processing apparatus according to the prior art.
Figure 2:
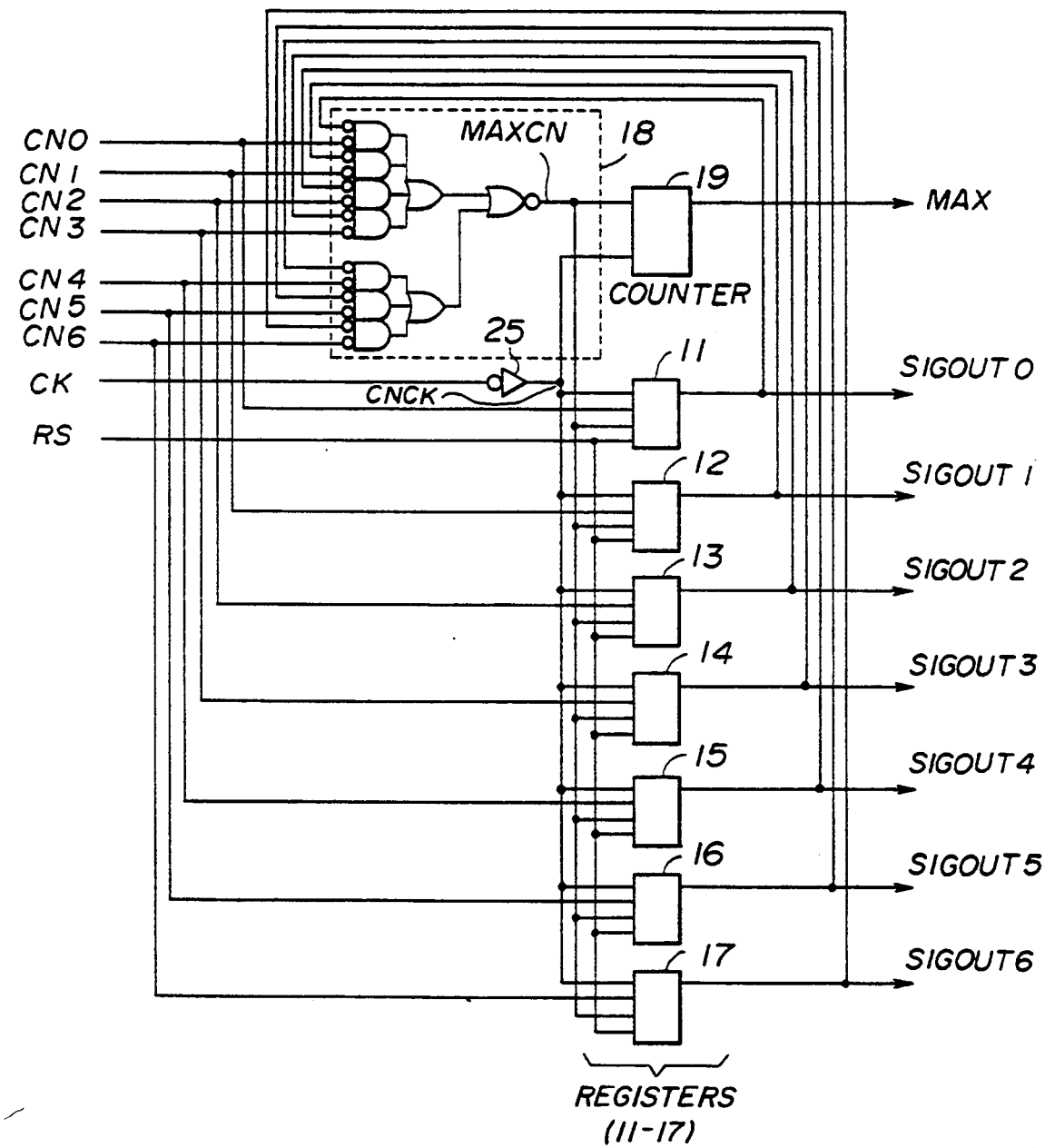
FIG. 2 is a block diagram showing an embodiment of an image data processing apparatus according to the present invention.

A description will be given of a preferred embodiment of an image data processing apparatus according to the present invention. FIG. 2 shows the construction of the image data processing apparatus according to the present invention. The image data processing apparatus shown in FIG. 2 generally has seven registers 11 through 17, a state checking unit 18, and a counter 19.

Figure 3:
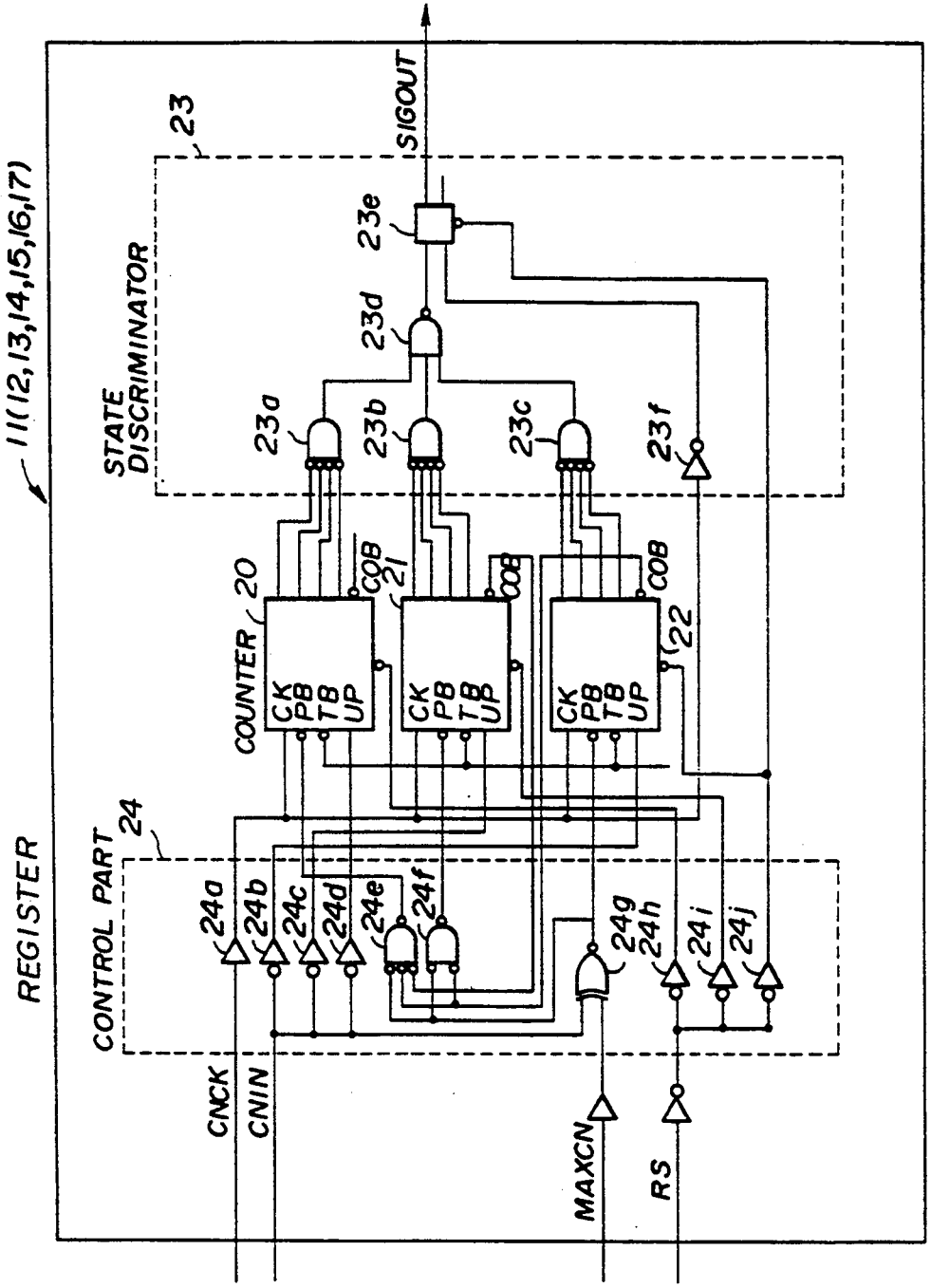
FIG. 3 is a block diagram showing one of a plurality of registers of the image data processing apparatus shown in FIG. 2.

FIG. 3 shows one of the seven registers 11 through 17 of the image data processing apparatus shown in FIG. 2. In the register shown in FIG. 3, three up/down counters 20-22, a state discriminator 23, and a control part 24 are provided. The counters 20-22 count a coincidence signal CNIN having a prescribed level, so that a count value signal indicating the number of coincidences is output to the state discriminator 23.

In the image data processing apparatus shown in FIG. 2, an inverter 25 is provided to output a clock CNCK from the input clock CK. This clock CNCK from the inverter 25 is input to each of the control parts of the seven registers 11-17. In synchronism with the clock CNCK, the control unit 24 controls up/down counting and holding operations of each of the three counters 20-22. In accordance with the count value signal from the counters 20-22, the state discriminator 23 produces an output signal SIGOUT to be output from a corresponding register (one of the seven registers 11-17). When it is detected that the count value signal from the counters 20-22 is equal to a prescribed value, a value of the output signal SIGOUT indicating that the register contains the maximum count value is output by the element 23. When it is detected that the count value signal from the counters 20-22 is smaller than the prescribed value, a value of the output signal SIGOUT indicating that the register does not contain the maximum count value is output.

In the register shown in FIG. 3, each of the three counters 20-22 is a 4-bit up/down counter, and the three counters 20-22 constitute a 12-bit up/down counter. Each of the counters 20-22 has a clock input terminal CK, a count control terminal UP, a hold terminal PB, and an input terminal TB. Each of the counters 20-22 performs a counting of the coincidence signal in synchronism with the clock CNCK having a prescribed period, input to the clock input terminal CK. The counting or holding operation of the counter is performed each time the clock CNCK changes from a low level to a high level, i.e., at a leading edge. When a high-level signal is input to the count control terminal UP, "up" counting is performed by the counter. When a low-level signal is input to the terminal UP, "down" counting is performed by the counter.

When a high-level signal is input to the hold terminal PB, the counter is inhibited from counting at the leading edge of the clock CNCK, so that the current count value is held in the counter. Each of the counters 20-22 has an output terminal COB, and a high-level signal is output from the terminal COB of the counter when the current count value in the counter is less than zero.

The state discriminator 23 of the register shown in FIG. 3 includes three NOR circuits 23a–23c, a NAND circuit 23d, a memory element 23e, and a clock inverter 23f. 4-bit data signals output from the counters 20-22 are respectively input to the NOR circuits 23a–23c. Output signals of the three NOR circuits 23a–23c are input to the NAND circuit 23d. The signal output from the NAND circuit 23d is stored in the memory element 23e, and this signal is output from the memory element 23e as the signal SIGOUT. The clock, input to each of the counters 20-22, is also input to the clock inverter 23f.

The control part 24 of the register shown in FIG. 3 includes a buffer 24a, three coincidence-signal inverters 24b–24d, two OR circuits 24e–24f, an exclusive-NOR circuit 24g, and three reset-signal inverters 24h–24j. The clock CNCK is input to the buffer 24a. The coincidence signal CNIN is input to each of the three inverters 24b–24d. The reset signal RS is input to each of the three inverters 24h–24j.

Figure 4:
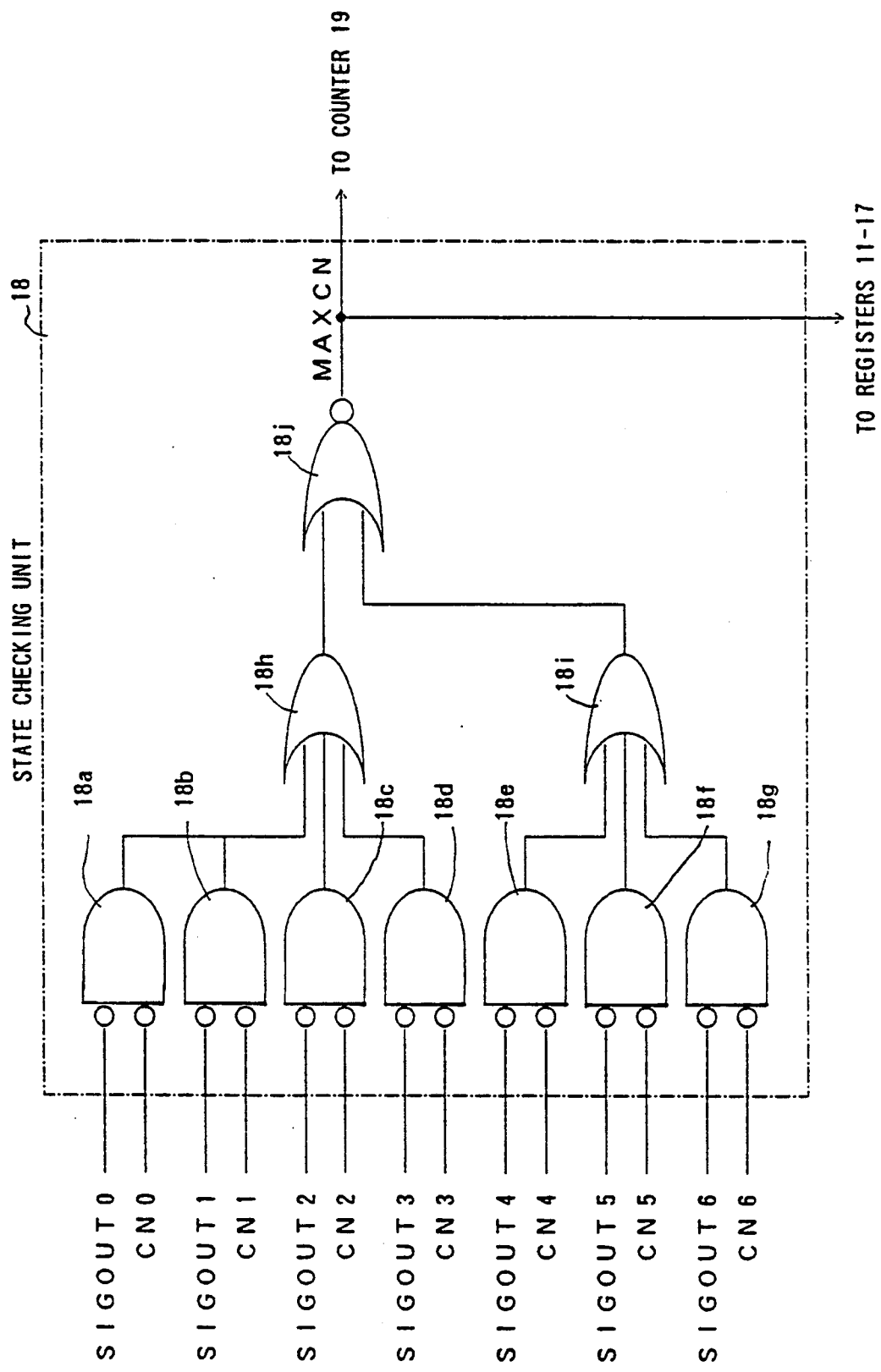
FIG. 4 is a block diagram showing a state checking unit of the image data processing apparatus shown in FIG. 2.

FIG. 4 shows the construction of the state checking unit 18 of the image data processing apparatus shown in FIG. 2. As shown in FIG. 4, the state checking unit 18 includes seven NAND circuits 18a–18g, two OR circuits 18h–18i, and a NOR circuit 18j. The output signals SIGOUT0–SIGOUT6 of the seven registers 11-17 and the coincidence signals CN0–CN6 are respectively input to the circuits 18a–18g. For example, the output signal SIGOUT0 of the register 11 and the coincidence signal CN0 are input to the circuit 18a. The output signals of the four circuits 18a–18d are input to the OR circuit 18h, and the output signals of the remaining circuits 18e–18g are input to the OR circuit 18i. The output signals of the two OR circuits 18h–18i are input to the NOR circuit 18j. The output signal MAXCN of the NOR circuit 18j is input to the counter 19 and input to the registers 11–17.

Next, a description will be given of the operation of the image data processing apparatus shown in FIGS. 2 through 4. In the following description, it is assumed that a target pixel in a stream of binary image data is sequentially converted into a piece of encoded data based on the probabilities of occurrence of the values 1 and 0, so that the encoded output data is obtained from the binary input image data. In the image data processing apparatus according to the present invention, each time a set of coincidence signals CN0–CN6 derived from the input image data is input to the registers 11–17 in synchronism with a clock having a prescribed period, the picture coding process for the target pixel is carried out.

It is also assumed that, in the image data processing apparatus according to the present invention, when one of the neighborhood pixels surrounding the target pixel in the input image data coincides with one of the reference dots at given locations relative to the location of the target pixel, a corresponding coincidence signal (one of the coincidence signals CN0–CN6) having the low level is provided. When the corresponding pixel mentioned above does not coincide with the corresponding dot, a coincidence signal having the high level is provided.

It is also assumed that a low-level output signal (one of the output signals SIGOUT0-SIGOUT6) is provided to the state checking unit 18 by a register of the seven registers 11–17 when the register contains the maximum count value. When a register of the registers 11–17 does not contain the maximum count value, a high-level output signal (one of the output signals SIGOUT0-SIGOUT6) is provided to the state checking part 18 by the register.

When a reset signal RS is input, the three up/down counters 20–22 of each of the registers 11–17 are initialized so that the values in the counters 20–22 are reset to zero. Also, when the reset signal RS is input, the memory element 23e and the counter 19 are initialized so that the values contained therein are reset to zero. After the initializing of the up/down counters is performed, all the count values in the registers are reset to zero. At this time, the low-level output signals SIGOUT-0-SIGOUT6 appear at the outputs of the registers 11–17.

At same time as the coincidence signals CN0–CN6 are input to the registers 11–17, the coincidence signals CN0–CN6 from the input image data as well as the output signals SIGOUT0-SIGOUT6 from the registers 11–17 are input to the state checking unit 18 as shown in FIG. 4. In accordance with these input signals, the state checking unit 18 detects whether or not the output signal level of a register containing the maximum count value currently changes from the previous output signal level.

When the state checking unit 18 detects that a coincidence signal having the low level (indicating the coincidence) is input to at least one of the registers having the maximum count value, it is judged that the output signal level of at least one of the registers containing the maximum count value does not currently change. The state checking unit 18 at this time outputs a signal MAXCN to the registers 11–17 (and to the counter 19), the signal MAXCN having a value indicating that the output signal level of at least one of the registers containing the maximum count value does not change.

When the state checking unit 18 detects that a coincidence signal having the high level (indicating no coincidence) is input to the registers having the maximum count value, it is judged that the output signal levels of the above mentioned registers currently change. The state checking unit 18 at this time outputs a signal MAXCN to the registers 11–17 (and to the counter 19), the signal MAXCN having a value indicating that the output signal levels of the above mentioned registers change.

In accordance with the coincidence signals CN0–CN6 of the input image data and the output signal MAXCN of the state checking unit 18, the control part 24 of each register allows the counters 20–22 to perform the "up" counting, the "down" counting, or the "holding" operation with respect to the current count value. After the up/down counting or the holding is performed by the counters 20–22, the state discriminator 23 produces an output signal SIGOUT indicating whether or not the corresponding register contains the maximum count value. As described above, if it is detected that a register has the maximum count value, a low-level output signal SIGOUT from the register is provided. If it is detected that a register does not have the maximum count value, a high-level output signal SIGOUT from the register is provided.

In the image data processing apparatus of the present invention, when it is detected from the state signal MAXCN that any register among the registers 11–17 has the maximum count value, the control part 24 allows the counters 20–22 to hold the current count value thereof in accordance with the low-level coincidence signal ( indicating the coincidence) being received. When it is detected from the state signal MAXCN that any register among the registers 11–17 has the maximum count value, the control part 24 allows the counters 20–22 to perform "down" counting so as to decrement the count value thereof each time the high-level coincidence signal (indicating the non-coincidence) is received.

In the image data processing apparatus of the present invention, when it is detected from the state signal MAXCN that any register among the registers 11–17 does not have the maximum count value, the control part 24 allows the counters 20–22 to hold the current count value in accordance with the high-level coincidence signal (indicating the non-coincidence) being received. When it is detected from the state signal MAXCN that any register among the registers 11–17 does not have the maximum count value, the control part 24 allows the counters 20–22 to perform "up" counting so as to increment the count value each time the low-level coincidence signal (indicating the coincidence) is received.

The following TABLE-1 briefly describes the operations performed by the up/down counters of each of the registers in the image data processing apparatus according to the present invention.

TABLE 1

| State Signal MAXCN | Coincidence Signal CNIN | Operations of Up/Down Counters |
| --- | --- | --- |
| Low | Low | Holding |
| Low | High | Down Counting |
| High | Low | Up Counting |

TABLE 1-continued

| State Signal MAXCN | Coincidence Signal CNIN | Operations of Up/Down Counters |
|---|---|---|
| High | High | Holding |

In the above described embodiment of the present invention, it is possible to build a compact image data processor for carrying out the picture coding process with no need to use many comparators or many selectors in the image data processing apparatus when the number of bits of the processed data signal is increased, or when the number of the input coincidence signals is increased.

Further, the present invention is not limited to the above described embodiment, and variations and modifications may be made without departing from the scope of the present invention.

What is claimed is:

1. An image data processing apparatus for converting binary input image data into encoded output image data, said apparatus comprising:

a plurality of registers each of which outputs an output signal in accordance with a corresponding signal of a plurality of input coincidence signals derived from the input image data, said output signal indicating whether or not a corresponding register has a maximum count value, and each input coincidence signal indicating whether or not a corresponding pixel among neighborhood pixels of a target pixel of the input image data, which pixel is to be encoded, coincides with a corresponding dot among predetermined reference dots at given locations relative to the location of the target pixel in the input image data; and state checking means for outputting a state signal indicating whether or not the output signal level of a first register having the maximum count value currently changes from the previous level by detecting the current output signal level of said first register in accordance with said input coincidence signals and in accordance with said output signals of said registers, each of said registers comprising:

counter means for incrementing or decrementing a count value of the register each time a corresponding input coincidence signal indicating said coincidence is received, so that said count value of the register is output;

control means for controlling counting operations of said counter means in accordance with a corresponding coincidence signal and in accordance with said state signal from said state checking means; and discrimination means for detecting whether or not said register has the maximum count value in accordance with the count value from said counter means so that the output signal indicating whether or not the register has the maximum count value is output.

2. An image data processing apparatus according to claim 1, wherein said plurality of input coincidence signals are input to said plurality of registers and to said state checking means in synchronism with a clock signal having a prescribed period.

3. An image data processing apparatus according to claim 1, wherein the first register having the maximum count value corresponds to one of the neighborhood pixels of the target pixel of the input image data at which the number of coincidences between said one of the neighborhood pixels and said one of the predetermined reference dots is highest.

4. An image data processing apparatus according to claim 1, wherein, when it is detected that a register has the maximum count value, said control means of the register allows said counter means to hold the count value of the register in accordance with an input coincidence signal indicating coincidence being received.

5. An image data processing apparatus according to claim 1, wherein, when it is detected that a register has no maximum count value, said control means of the register allows said counter means to hold the count value of the register in accordance with an input coincidence signal indicating non-coincidence being received.

6. An image data processing apparatus according to claim 1, wherein, when it is detected that a register has no maximum count value, said control means of the register allows said counter means to increment the count value of the register each time an input coincidence signal indicating coincidence is received.

7. An image data processing apparatus according to claim 1, wherein, when it is detected that a register has the maximum count value, said control means of the register allows said counter means to decrement the count value of the register each time an input coincidence signal indicating non-coincidence is received.

8. An image data processing apparatus according to claim 1, wherein said state checking means outputs the state signal to said control means of each of said registers in synchronism with a clock signal having a prescribed period.

* * * * *